US012767421B2

(12) United States Patent
Huang

(10) Patent No.: US 12,767,421 B2
(45) Date of Patent: Oct. 20, 2026

(54) ELECTRONIC MEDICINE BOX WITH A MEDICINE CUP AND ITS USAGE METHOD

(71) Applicant: XIAMEN LANXING TECHNOLOGY CO., LTD., Xiamen (CN)

(72) Inventor: Baozhen Huang, Xiamen (CN)

(73) Assignee: XIAMEN LANXING TECHNOLOGY CO., LTD., Xiamen (CN)

( * ) Notice: Subject to any disclaimer, the term of this patent is extended or adjusted under 35 U.S.C. 154(b) by 339 days.

(21) Appl. No.: 18/609,699

(22) Filed: Mar. 19, 2024

(65) Prior Publication Data

US 2025/0236451 A1 Jul. 24, 2025

(30) Foreign Application Priority Data

Jan. 18, 2024 (CN) ......................... 202410073026.2

(51) Int. Cl.
*B65D 83/04* (2006.01)
*A61J 7/04* (2006.01)

(52) U.S. Cl.
CPC ........ *B65D 83/0454* (2013.01); *A61J 7/0409* (2013.01); *A61J 7/0436* (2015.05)

(58) Field of Classification Search
None
See application file for complete search history.

(56) References Cited

U.S. PATENT DOCUMENTS 8,391,104 B2 * 3/2013 de la Huerga ........ A61J 1/1437 235/375
9,870,450 B2 * 1/2018 Blackburn ............. A61B 34/10
10,028,889 B2 * 7/2018 Despa ................. G07F 17/0092
11,901,059 B2 * 2/2024 Pugsley ................ A61J 7/0084
2009/0294521 A1 * 12/2009 de la Huerga .......... A61J 1/035 235/375
2014/0074283 A1 * 3/2014 Blackburn ............ A61J 7/0076 700/237
2016/0075460 A1 * 3/2016 Despa ................... A61J 7/0084 700/240

(Continued)

FOREIGN PATENT DOCUMENTS

CN 201366095 Y * 12/2009
CN 103156778 A * 6/2013

(Continued)

*Primary Examiner* — Jeff Zimmerman

(57) ABSTRACT

The present disclosure provides an electronic medicine box with a medicine cup and its usage method. The electronic medicine box with a medicine cup includes a housing, a cellular tray, a connecting assembly, a plurality of medicine cups, a driving mechanism, and a lifting mechanism. The housing is provided with a medicine taking port. The cellular tray is provided with a plurality of placement slots that are configured for accommodating the plurality of medicine cups. The cellular tray is rotatably disposed inside the housing through the connecting assembly, and is provided with the driving mechanism that is configured for rotating the cellular tray. The lifting mechanism is configured for pushing the medicine cup out of the placement groove towards the medicine port. The electronic medicine box with the medicine cup further includes a first infrared sensor, a camera, and a first sensing element.

10 Claims, 8 Drawing Sheets

(56) References Cited

U.S. PATENT DOCUMENTS

| | | | | |
|---|---|---|---|---|
| 2018/0092697 | A1* | 4/2018 | Blackburn | A61B 34/10 |
| 2019/0282450 | A1* | 9/2019 | Lam | A61J 7/0481 |
| 2021/0205180 | A1* | 7/2021 | Pugsley | A61J 7/0084 |
| 2023/0248614 | A1* | 8/2023 | Aon | A61J 7/0418 700/242 |
| 2024/0420818 | A1* | 12/2024 | Pugsley | A61J 7/0084 |

FOREIGN PATENT DOCUMENTS

| | | | | | |
|---|---|---|---|---|---|
| CN | 104257503 | A | * | 1/2015 | |
| CN | 105168002 | A | * | 12/2015 | A61J 7/0409 |
| CN | 105796360 | A | * | 7/2016 | A61J 7/0436 |
| CN | 105816328 | A | * | 8/2016 | A61J 7/0472 |
| CN | 106344402 | A | * | 1/2017 | A61J 1/03 |
| CN | 206102273 | U | * | 4/2017 | |
| CN | 206142178 | U | * | 5/2017 | |
| CN | 206404042 | U | * | 8/2017 | |
| CN | 107260536 | A | * | 10/2017 | A61J 7/0454 |
| CN | 107582403 | A | * | 1/2018 | |
| CN | 207855965 | U | * | 9/2018 | |
| CN | 109018726 | A | * | 12/2018 | A61J 7/0409 |
| CN | 209137351 | U | * | 7/2019 | |
| CN | 110731905 | A | * | 1/2020 | A61B 5/1117 |
| CN | 110974692 | A | * | 4/2020 | A61B 5/02438 |
| CN | 111012676 | A | * | 4/2020 | A61J 7/0436 |
| CN | 212048798 | U | * | 12/2020 | |
| CN | 219814734 | U | * | 10/2023 | |
| TW | 585967 | U | * | 11/2019 | |
| WO | WO-2020092338 | A1 | * | 5/2020 | G06K 19/0776 |

* cited by examiner

ELECTRONIC MEDICINE BOX WITH A MEDICINE CUP AND ITS USAGE METHOD

TECHNICAL FIELD

The present disclosure relates to the field of electronic medicine box technology, and in particular to an electronic medicine box with a medicine cup and its usage method.

BACKGROUND

In recent years, both developed and developing countries have experienced rapid development in the home healthcare market. With the arrival of an aging population, the vast majority of people suffer from various chronic diseases, requiring a large amount of corresponding medicine. According to a research report by Mckinsey & Company, about 70% of patients with chronic disease often forget to take medicine at the designated time, leading to the deterioration of their condition and even death.

Taking medicine on time is one of the key factors to ensure treatment effect. Many drugs need to be taken at specific times to achieve optimal results. When the medicine is taken irregularly, it can affect the concentration and action of the drug in the body, reducing the treatment effect. For the patients with chronic disease, taking medicine on time can reduce the symptoms of the disease and improve the quality of life of the patients.

At present, the method for detecting whether a medicine cup is taken out from an electronic medicine box is usually mechanical detection. The mechanical detection usually uses a mechanical component, such as a spring or a lever, to detect whether the medicine cup is taken out by a weight change or a pressure change of the medicine cup. This method may not accurately detect whether the medicine cup is taken out due to mechanical wear or sticking, resulting in poor reliability. Moreover, current electronic medicine box cannot detect whether there is medicine in the medicine cup, which may cause a user to miss taking the medicine or repeat taking the medicine, thereby affecting the treatment effect.

SUMMARY OF THE DISCLOSURE

In response to the problems existing in the aforementioned related arts, the present disclosure provides an electronic medicine box with a medicine cup and its usage method, which may effectively solve the problems existing in the aforementioned related arts.

The technical solutions of the present disclosure are as follows.

The present disclosure discloses an electronic medicine box with a medicine cup includes a housing, a cellular tray, a connecting assembly, a plurality of medicine cups, a driving mechanism, a lifting mechanism, a first infrared sensor, and a first sensing element. The housing is provided with a medicine taking port. The cellular tray is provided with a plurality of placement slots that are configured for accommodating the plurality of medicine cups. The cellular tray is rotatably disposed inside the housing through the connecting assembly, and is provided with the driving mechanism that is configured for rotating the cellular tray. The lifting mechanism is configured for pushing the medicine cup out of the placement groove towards the medicine port. The first infrared sensor and the first sensing element are configured for detecting whether the medicine cup on the medicine taking port is taken away. The housing is fixedly provided with the first infrared sensor, and an outer side wall of the medicine cup is fixedly provided with the first sensing element that is coordinated with the first infrared sensor. A camera is fixedly disposed on the housing, and the camera is configured to detect whether there is medicine in the medicine cup on the medicine taking port.

The present disclosure further provides a usage method of an electronic medicine box that includes the follow operations:

S1, after receiving a medicine taking instruction, a control circuit module (100) of the electronic medicine box entering a medicine taking mode;

S2, capturing an image of a medicine cup (5) by a camera (8) and inputting image information to the control circuit module (100), wherein the control circuit module (100) analyzes and processes a captured image by using an image recognition technology, so as to determine whether there is medicine in the medicine cup (5); when there is no medicine in the medicine cup (5), an operation S3 is executed; when there is medicine in the medicine cup (5), an operation S4 is executed;

S3, driving a cellular tray (4) to rotate one grid by a driving mechanism (2), switching the next medicine cup (5) to a medicine taking port (131), and executing the operation S2;

S4, moving the medicine cup (5) upwards to the medicine taking port (131) by the lifting mechanism (6);

S5, after taking away the medicine cup (5), triggering the first infrared sensor (7) and feeding back a signal to the control circuit module (100), to determine that the medicine cup (5) on the medicine taking port (131) is taken away, and executing an operation S6;

S6, resetting the lifting mechanism (6) to prepare for the next taking medicine.

By adopting the above technical solutions, compared with the related arts, the effects of the present disclosure are as follows.

First, in the present disclosure, the first infrared sensor is configured to reflect the infrared light through the first sensing element of the medicine cup, further causing a change in the voltage value of the infrared receiving tube to detect whether the medicine cup is taken out. Thus, non-contact detection is implemented, ensuring that the medicine cup is on the medicine taking port and providing real-time feedback to the control circuit module. The system has strong scalability and may increase or decrease the number of first infrared sensors according to need, to adapt to different specifications and quantities of medicine cups. Thus, the stability and reliability of the entire system are improved, and faults and errors are reduced.

Second, the status of the medicine cup and the medicine are detected through the first infrared sensor and the camera, and combined with the first micro switch, accurate control of the lifting mechanism is achieved. The first infrared sensor determines whether the medicine cup is taken away by sensing the reflection of infrared light changes of the medicine cup, and the camera may determine whether there is medicine in the medicine cup by capturing and analyzing images. The two methods complement each other, thereby more precisely controlling the electronic medicine box.

BRIEF DESCRIPTION OF THE DRAWINGS

In order to more clearly illustrate the technical solutions in some embodiments of the present disclosure or in the related art, hereinafter, a brief introduction will be given to the accompanying drawings that are used in the description of some embodiments or the related art. Obviously, the accompanying drawings in the description below are merely some embodiments of the present disclosure. For those of ordinary skill in the art, other accompanying drawings may be obtained based on these accompanying drawings without any creative efforts.

DETAILED DESCRIPTION

The present disclosure may be explained in detail by combining the accompanying drawings and some embodiments. It is particularly pointed out that the following embodiments are only used to illustrate the present disclosure, but do not limit the scope of the present disclosure. Similarly, the following embodiments are only partial embodiments of the present disclosure and not all embodiments. All other embodiments obtained by those of ordinary skill in the art without creative effort are within the scope of the present disclosure.

As illustrated in FIG. 1 to FIG. 9, an electronic medicine box with a medicine cup and its usage method are provided in the present disclosure.

Figure 1:
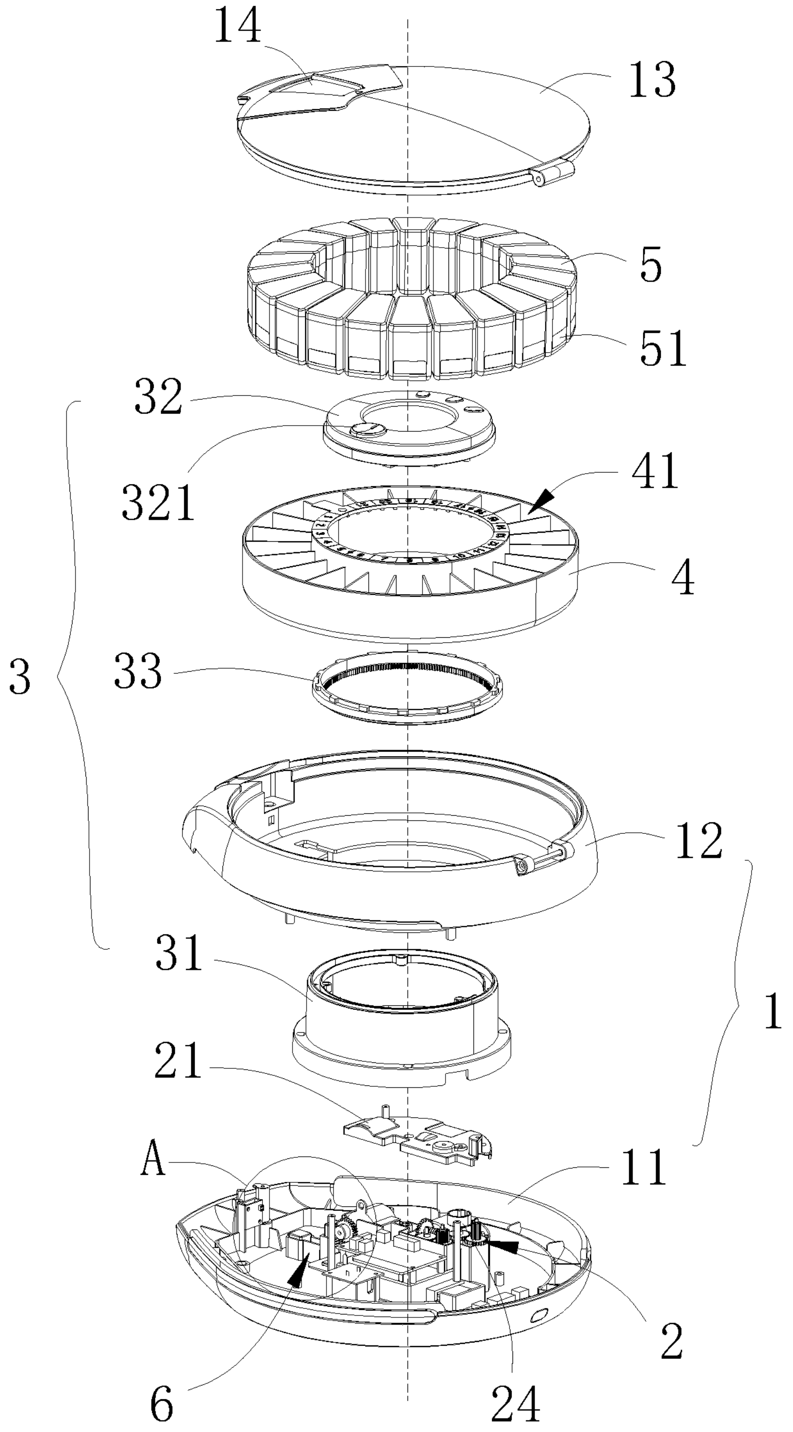
FIG. 1 is an exploded structural schematic view of an electronic medicine box with a medicine cup in some embodiments of the present disclosure.
Figure 6:
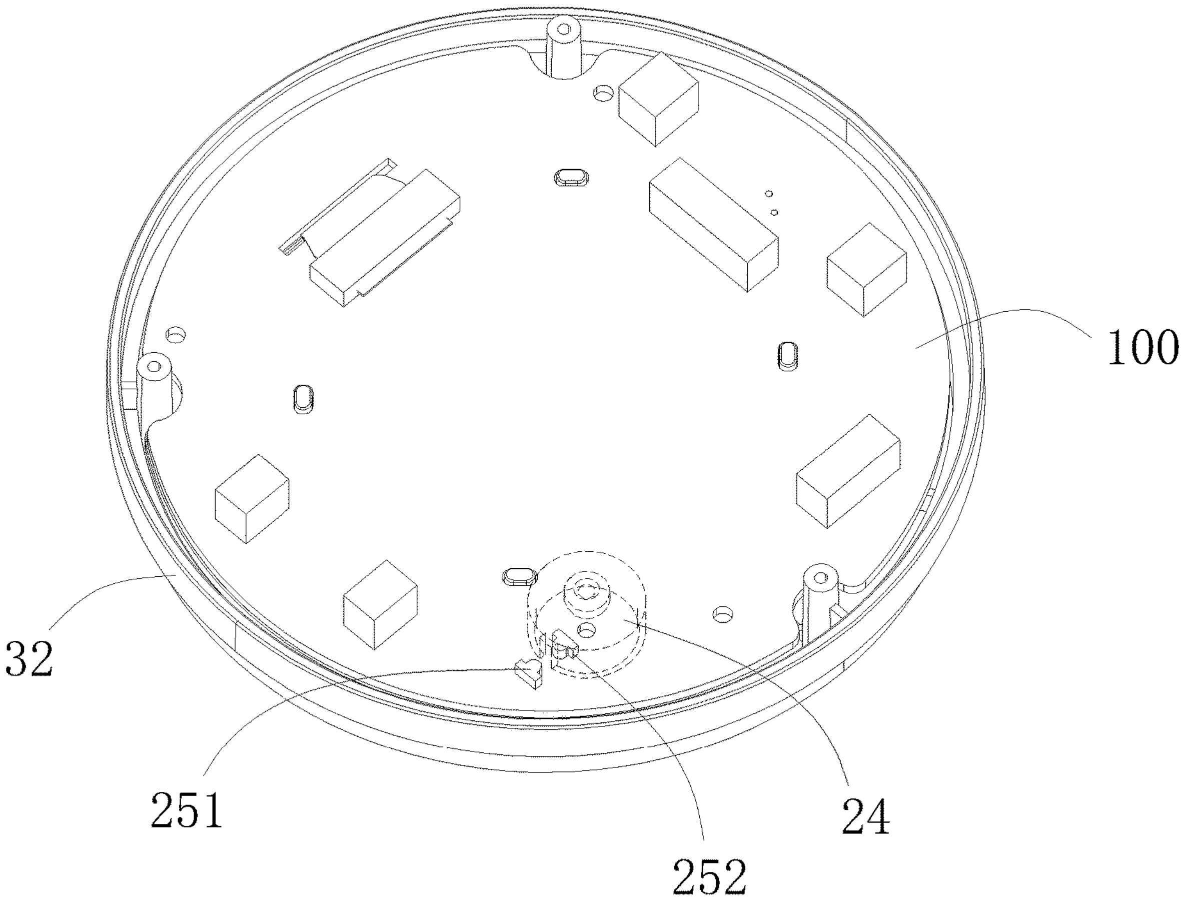
FIG. 6 is an inverted schematic view of a cover plate in some embodiments of the present disclosure, and a dashed line represents a second sensing element.
Figure 7:
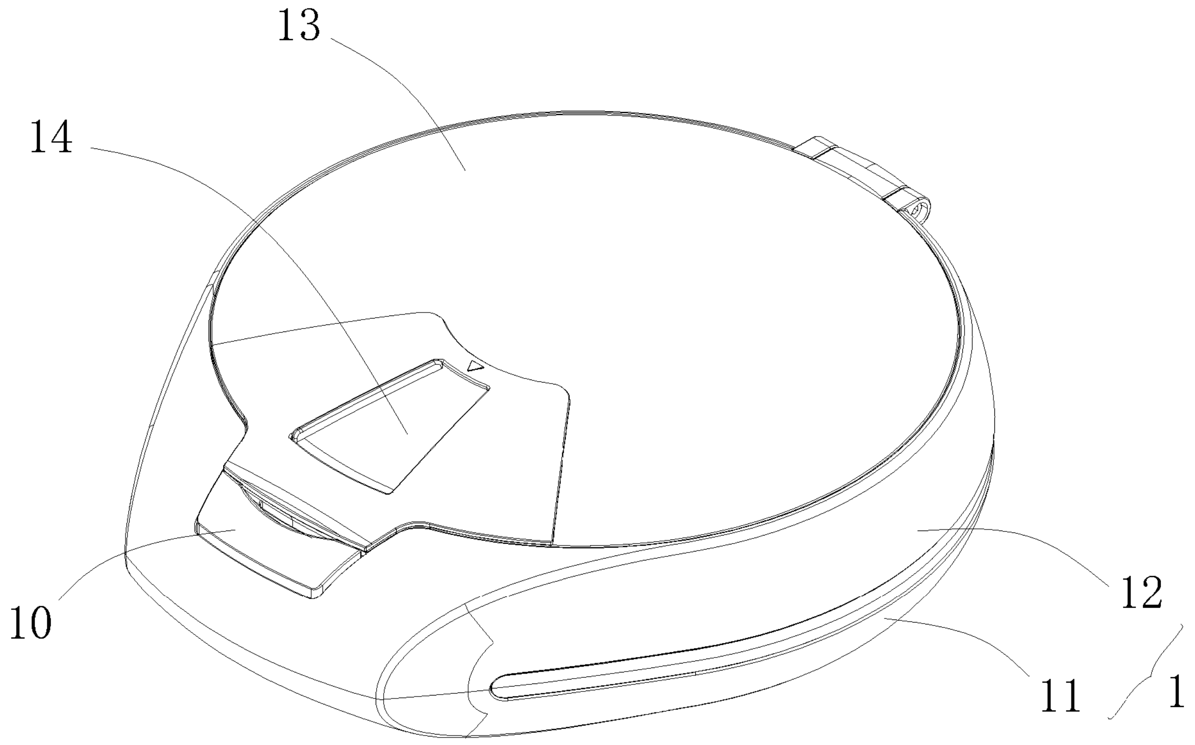
FIG. 7 is a three-dimensional structural schematic view of the electronic medicine box with the medicine cup in some embodiments of the present disclosure.
Figure 8:
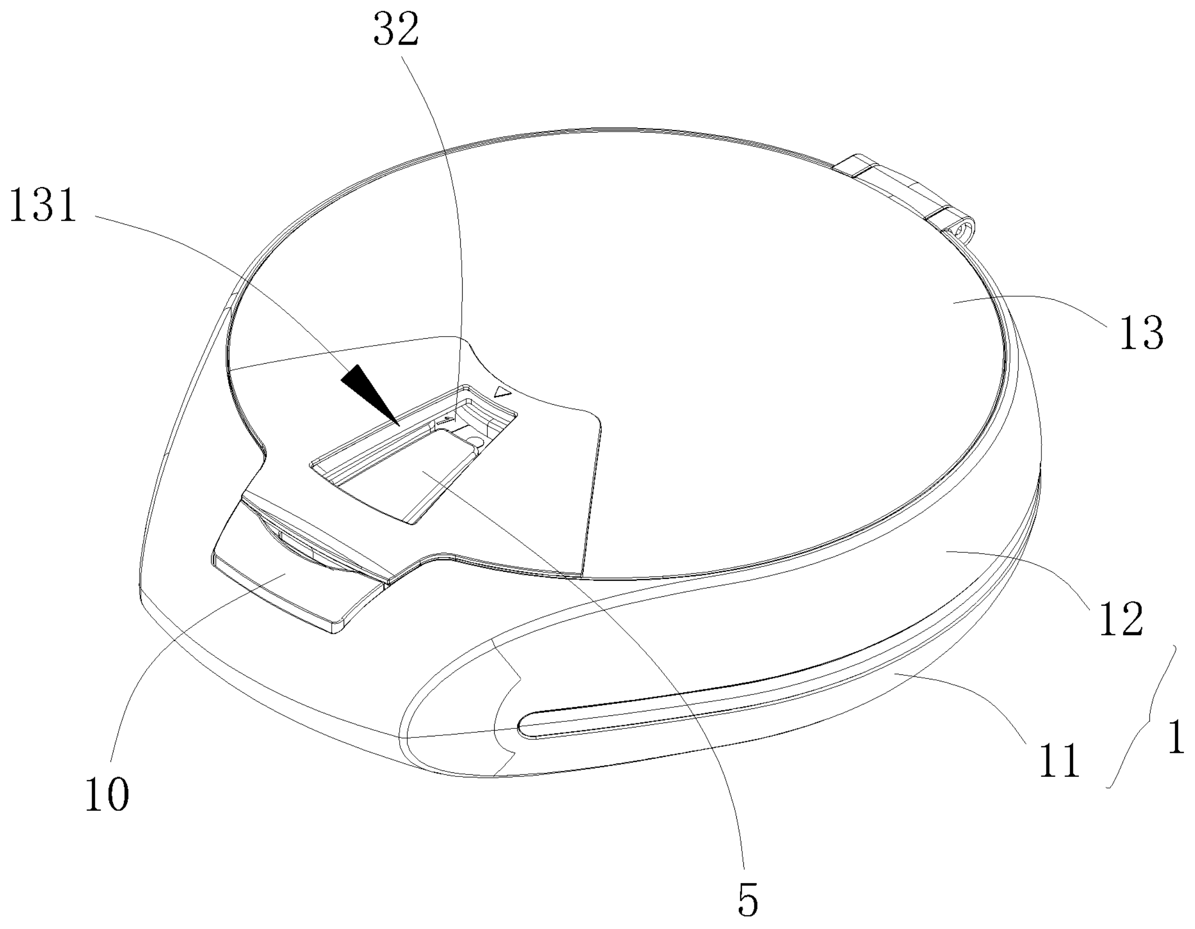
FIG. 8 is a three-dimensional structural schematic view of the electronic medicine box with the medicine cup without a sliding sheet in some embodiments of the present disclosure.
Figure 9:
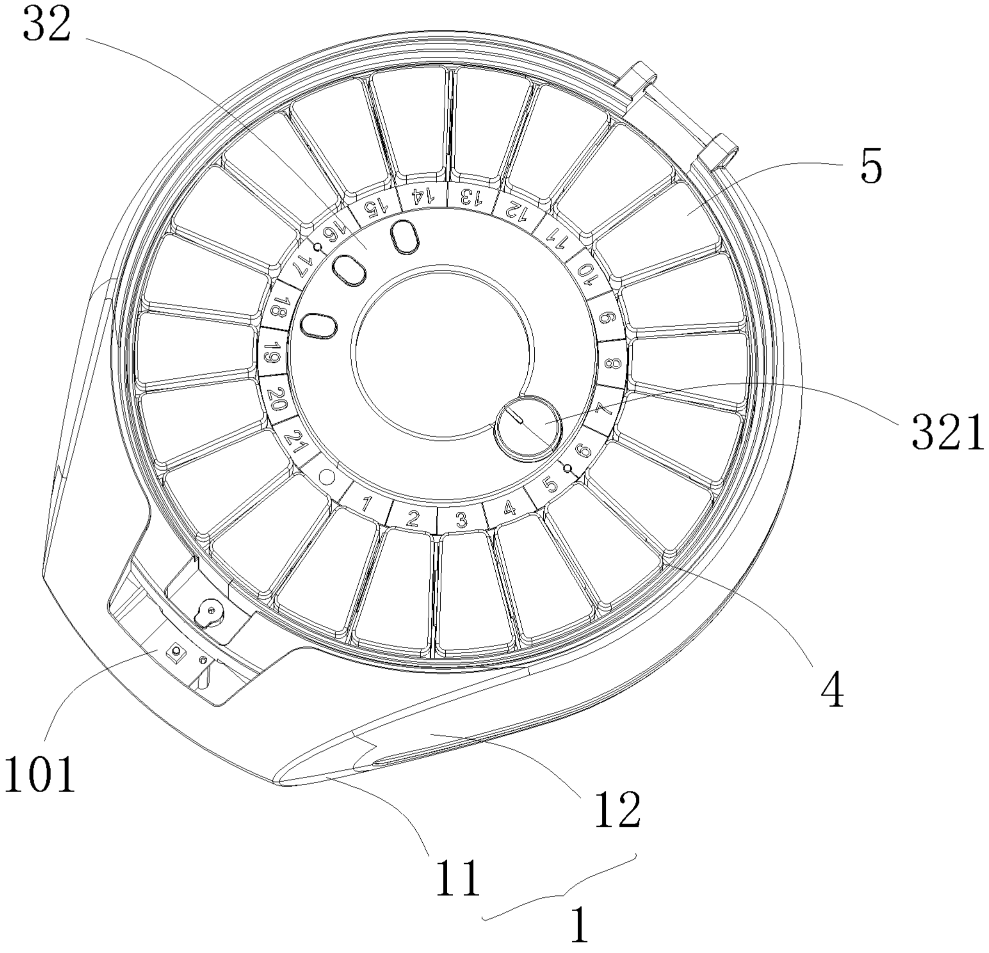
FIG. 9 is a three-dimensional structural schematic view of the electronic medicine box with the medicine cup without the sliding sheet and a top cover in some embodiments of the present disclosure.

Referring to FIG. 1, FIG. 6, and FIG. 7, the electronic medicine box with the medicine cup includes a housing 1 including a first housing 11, a second housing 12, and a top cover 13. The first housing 11 and the second housing 12 are interlocked to form a cavity between the first housing 11 and the second housing 12 for assembling internal elements. An upper end of the second housing 12 is further hinged with the top cover 13. The top cover 13 is provided with a medicine taking port 131. A sliding sheet 14 is disposed and slides at an opening of the medicine taking port 131 to close the medicine taking port 131, so as to avoid the medicine being contaminated by moisture or dust. When needed, a user may open the sliding sheet 14 and take the medicine from the medicine taking port 131.

Referring to FIG. 1, the electronic medicine box with the medicine cup further includes a cellular tray 4, a connecting assembly 3, a medicine cup 5, a driving mechanism 2, and a lifting mechanism 6. The Cellular tray 4 is provided with multiple placement slots 41 for accommodating multiple medicine cups 5. Each placement slot 41 is one grid or one compartment of the cellular tray 4. The cellular tray 4 is rotatably disposed inside the housing 1 through the connecting assembly 3. In some embodiments, the connecting assembly 3 includes a tube body 31, a cover plate 32, and a gear ring 33. A bottom of the tube body 31 is fixedly disposed on the first housing 11, a top of the tube body 31 is rotatably provided with the gear ring 33, and the gear ring 33 is fixedly provided with the cellular tray 4. The top of the tube body 31 is further fixedly provided with the cover plate 32, which limits the cellular tray 4 and the gear ring 33 between the tube body 31 and the cover plate 32. A top of the cover plate 32 is provided with multiple buttons, and a bottom of the cover plate 32 is fixedly provided with a control circuit module 100. Due to the fact that the connecting assembly 3 belongs to existing technology, the specific structures of components of the connecting assembly 3 may not be repeated here. In addition, the first housing 11 is further provided with the driving mechanism 2 for driving the gear ring 33. The drive mechanism 2 drives the gear ring 33 to rotate, which in turn drives the cellular tray 4. In some embodiments, the driving mechanism 2 is mainly composed of a second motor 22 and a gear set 23. An output shaft of the second motor 22 is in transmission connection with the gear ring 33 through the gear set 23.

The electronic medicine box with the medicine cup further includes a second infrared sensor 25 and a second sensing element 24. The second sensing element 24 is assembled on the gear set 23 and provided with the second infrared sensor 25. The gear set 23 drives the second sensing element 24, thereby triggering the second infrared sensor 25, so as to control a rotation angle of the cellular tray 4.

In some embodiments, the second infrared sensor 25 is assembled in the control circuit module 100. The second infrared sensor 25 is a transceiver split-type infrared sensor that includes a transmitter 251 and a receiver 252. The second sensing element 24 is a tube body with a notch 241 on a side wall of the tube body. One end of the second sensing element 24 is fixedly connected to one gear of the gear set 23, and the other end of the second sensing element 24 extends towards the control circuit module 100, so that the transmitter 251 and receiver 252 are respectively located on an inner side and an outer side of the second sensing element 24, and configured to block the infrared ray of the second infrared sensor 25. When the second sensing element 24 rotates once circumference with the gear set 23 and the notch 241 passes between the transmitter and the receiver of the infrared sensor, the infrared sensor is triggered once and the second motor 22 is turned off by the control circuit module 100. At this time, the cellular tray 4 rotates exactly one grid to ensure that one placement slot 41 accurately stays on the medicine taking port 131 after each rotation, avoiding the misalignment of the placement slot 41 and the medicine taking port 131 and the failure to take medicine.

Figure 2:
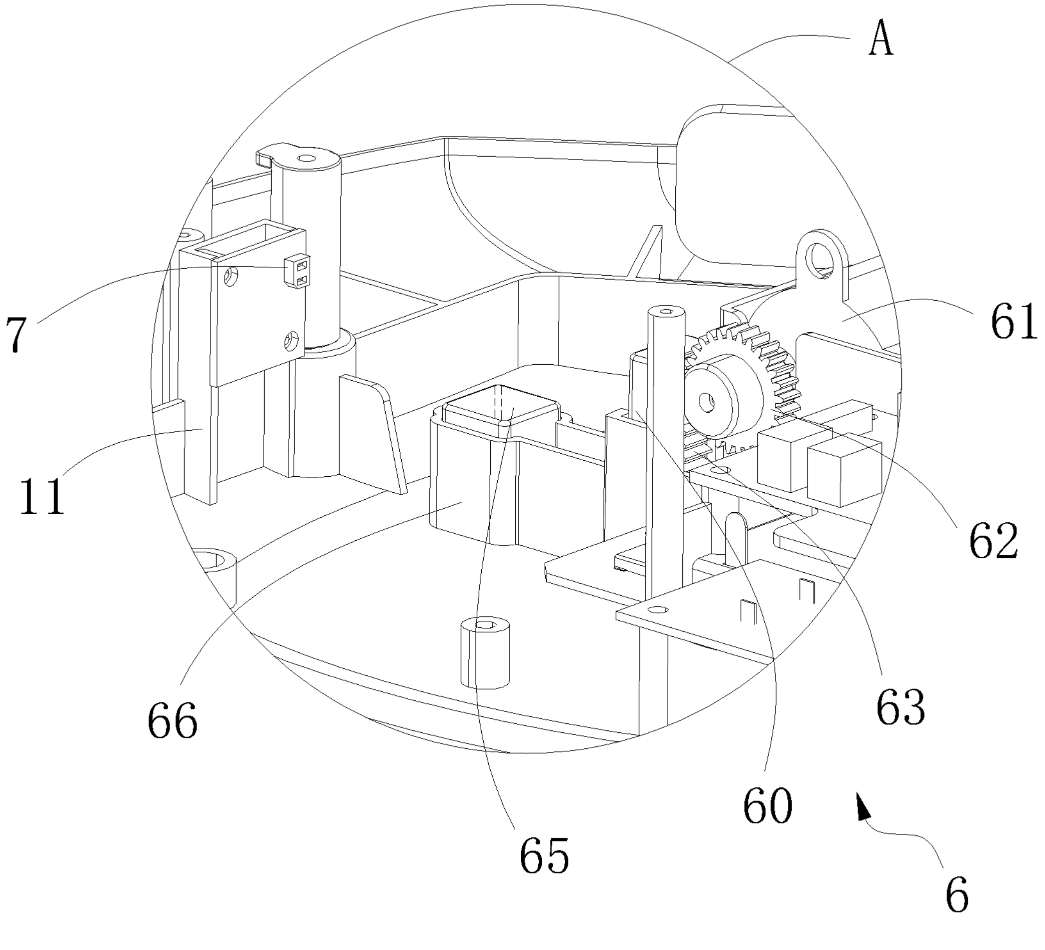
FIG. 2 is an enlarged structural schematic view of an area A of FIG. 1 in some embodiments of the present disclosure.

Referring to FIG. 1 and FIG. 2, the electronic medicine box with the medicine cup further includes a first infrared sensor 7 and a first sensing element 51. The housing 1 is fixedly provided with the first infrared sensor 7 for detecting whether the medicine cup 5 on the medicine taking port 131 is taken away. An outer side wall of the medicine cup 5 is fixedly provided with the first sensing element 51 that is coordinated with the first infrared sensor 7. In some embodiments, the first infrared sensor 7 is a transceiver integrated infrared sensor. The first infrared sensor 7 is fixedly installed on the first housing 11 and is located on an outer side below the medicine taking port 131, a transceiver surface faces towards the inner side below the medicine taking port 131, i.e., towards an outer side wall of the cellular tray 4. The first sensing element 51 is a thin sheet, fixed and embedded on the outer side wall of the medicine cup 5, and configured for reflecting the infrared ray of the first infrared sensor 7. In the present embodiment, the first sensing element 51 is an aluminum foil paper. Of course, the first sensing element 51 may also be made of a high reflective material, such as a metal material element, a highlight ABS plastic element, etc., which may not repeat here.

Referring to FIG. 1 to FIG. 5, the electronic medicine box with the medicine cup further includes the lifting mechanism 6 that configured for pushing the medicine cup 5 out of the placement slot 41 towards the medicine taking port 131. The lifting mechanism 6 includes a movable rod 60, a top holding column 65, and a driving device 61. The housing 1 is provided with a sliding rail 66, and the movable rod 60 may be moved up and down on the sliding rail 66, and is provided with the driving device 61 that allows the movable rod 60 to move up and down. In some embodiments, A side wall of the movable rod 60 is provided with a rack 63, the driving device 61 is a first motor, and an output shaft of the first motor is in transmission connection with the rack 63 through the gear 62. The first infrared sensor 7 is configured to start the first motor when the medicine cup 5 is taken away, so that the first motor drives the top holding column 65 to move down and reset. The top holding column 65 is fixedly disposed on the movable rod 60 through a connecting rod 64. The top holding column 65, the connecting rod 64, and the movable rod 60 may be moved up and down on the sliding rail 66. A first avoidance groove 42 may be defined on a bottom of the cellular tray 4, thereby allowing the top holding column 65 to push the medicine cup 5 out through the first avoidance groove 42. A limit strip 641 is fixedly disposed on an end of the connecting rod 64. When the connecting rod 64 is moved up, an upper end face of the limit strip 641 abuts against the bottom of the cellular tray 4.

Figure 3:
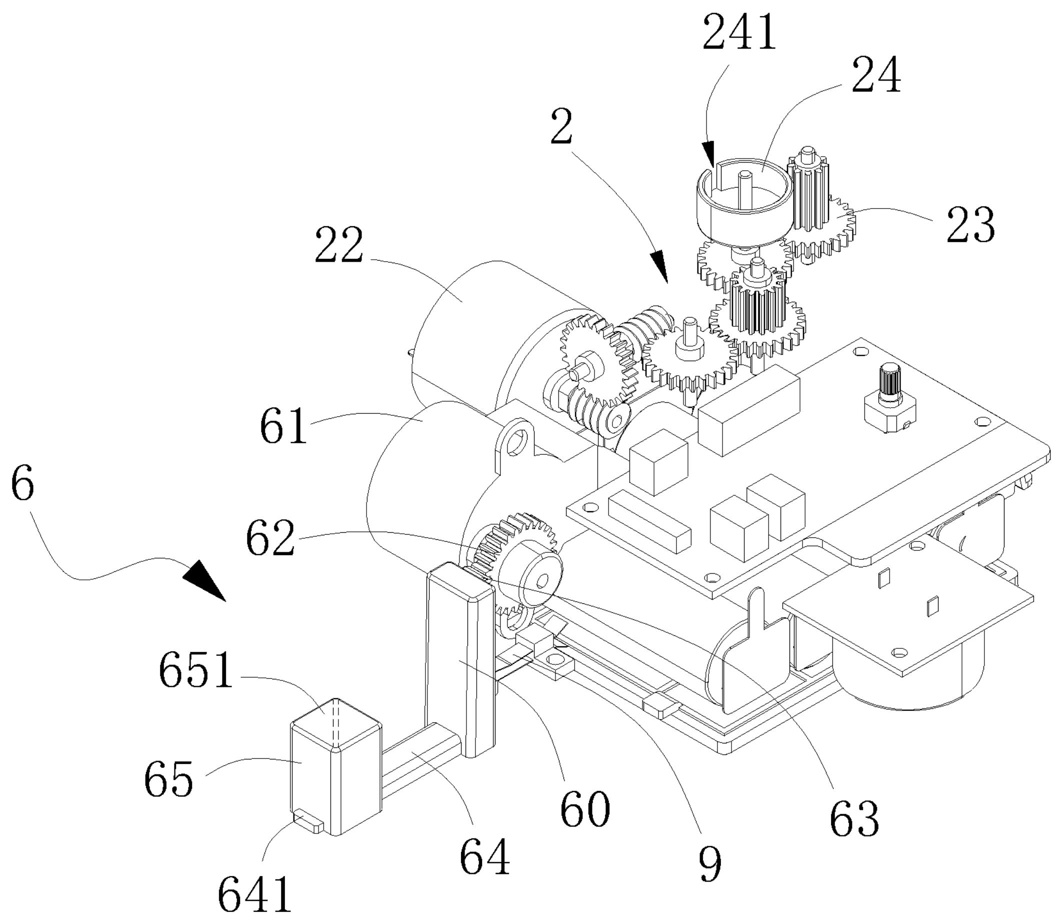
FIG. 3 is a cross-sectional structural schematic view in some embodiments of the present disclosure.
Figure 4:
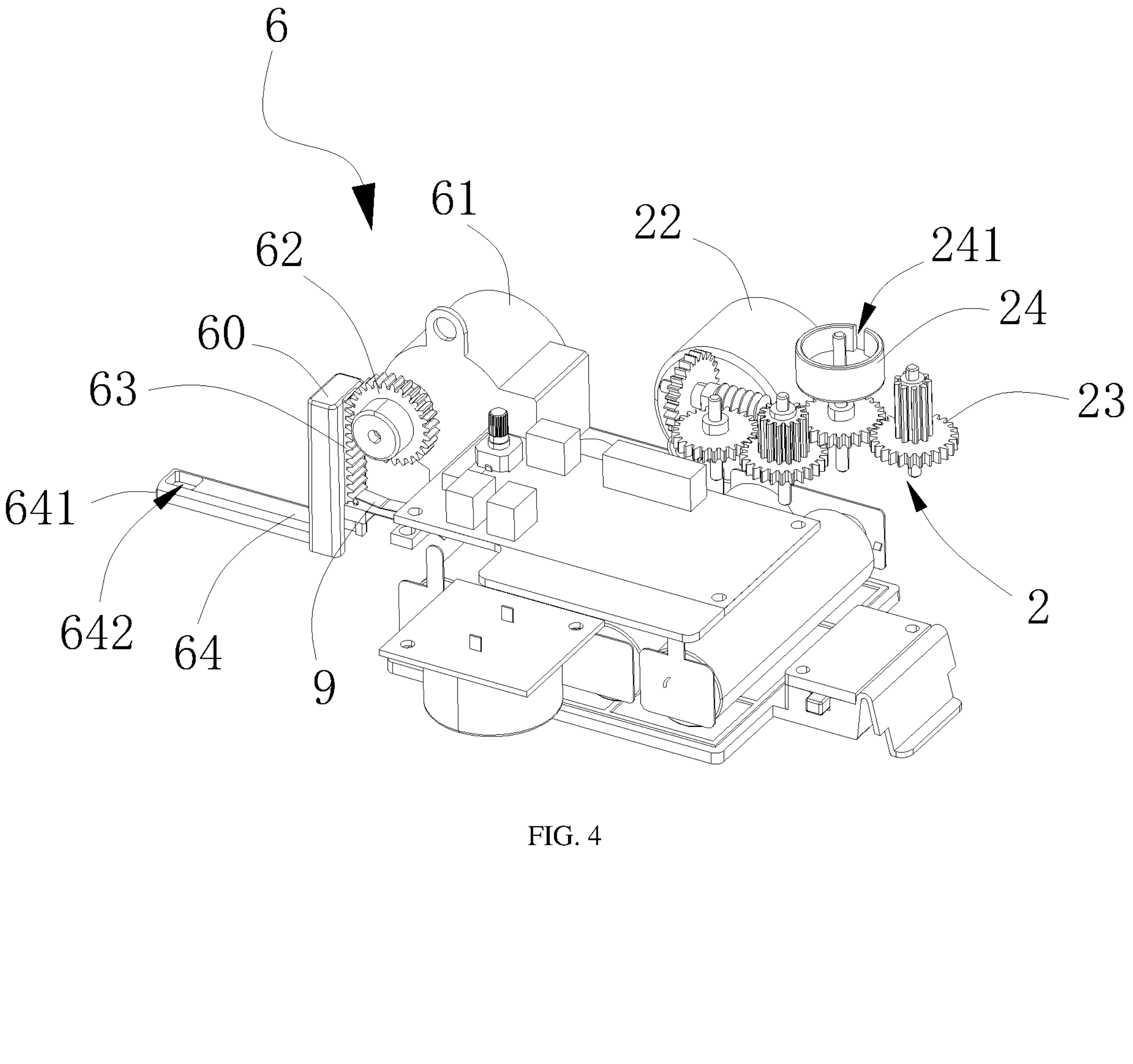
FIG. 4 is a three-dimensional structural schematic view of a lifting mechanism from a first perspective in some embodiments of the present disclosure.
Figure 5:
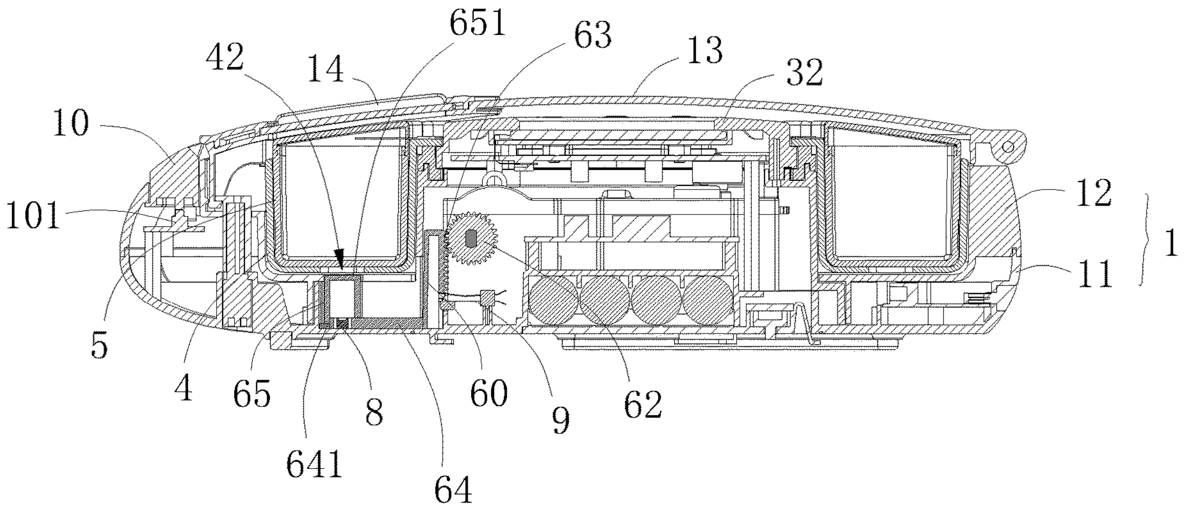
FIG. 5 is a three-dimensional structural schematic view of the lifting mechanism without a top holding column from a second perspective in some embodiments of the present disclosure.

Referring to FIG. 3 to FIG. 5, in the present embodiment, the first housing 11 is fixedly provided with a camera 8, and the camera 8 is configured to detect whether there is medicine in the medicine cup 5 on the medicine taking port 131. The movable rod 60 is fixedly provided with the top holding column 65, and the top holding column 65 is located below the medicine cup 5. The movable rod 60 is provided with a second avoidance groove 642, and the movable rod 60 is sleeved on the camera 8 through the second avoidance groove 642.

The top holding column 65 is a cover body, and disposed on the outside camera 8. A top circumference 651 of the top holding column 65 is a transparent surface, which not only ensures that the camera 8 may capture whether there is medicine inside the medicine cup 5, but also protects the camera 8, isolating dust from falling into the lens of the camera 8, achieving a dust-proof effect. Compared with the maintenance of the camera 8, the maintenance of the top panel 651 is much easier and simpler. Furthermore, the bottom and the side walls of the medicine cup 5 are also transparent surfaces, further expanding a capture area of the camera 8 to cover the entire medicine cup 5, ensuring the accuracy of the detection results.

The first infrared sensor 7 detects whether the medicine cup 5 is taken away by sensing the reflection of infrared light changes of the medicine cup 5, while the camera 8 may determine whether there is medicine inside the medicine cup 5 by capturing and analyzing images. The two methods complement each other and may improve the accuracy of detection. Of course, the camera 8 may further be configured to determine whether the medicine cup 5 is taken away.

The first housing 11 is further fixedly provided with a first microswitch 9, and the first microswitch 9 is located below the movable rod 60. The first microswitch 9 is electrically connected to the control circuit module 100. When the movable rod 60 is moved down and reset, the first microswitch 9 is triggered and the signal is fed back to the control circuit module 100. The control circuit module 100 shuts down the first motor and stops the movable rod 60 from moving down.

The first housing 11 is provided with a medicine taking button 10, and a second microswitch 101 is fixedly disposed on the housing 11 and below the medicine taking button 10. The second microswitch 101 is electrically connected to the control circuit module 100.

Referring to FIG. 1, the top of the cover plate 32 is further provided with a knob switch 321 that is configured for setting system time and a timing alarm. The knob switch 321 is a coding knob switch, or an adjustable resistance knob switch, etc.

In use, the order and time of taking away each medicine cup 5 are set in advance by using multiple buttons and the knob switch 321 on the cover plate 32. The control circuit module 100 rotates the medicine cup 5 that needs to remind the user to take medicine to the right below the medicine taking port 131 according to the order and time of taking away the medicine cup 5, and sends out a prompt signal (including but not limited to a prompt sound or light). When the user presses the medicine taking button 10, the control circuit module 100 enters a medicine taking mode.

The present disclosure further provides a usage method of the electronic medicine box with a structure as described above, and the method includes the following operations S1 to S6.

At the operation S1, the method may include after receiving a medicine taking instruction, the control circuit module 100 entering the medicine taking mode. In some embodiments, after the sliding sheet 14 is opened, the user presses the medicine taking button 10, and the second microswitch 101 is triggered and the signal is fed back to the control circuit module 100 as the medicine taking instruction, thereby entering the medicine taking mode;

At the operation S2, the method may include capturing an image of the medicine cup 5 by the camera 8 and inputting image information to the control circuit module 100, wherein the control circuit module 100 analyzes and processes a captured image by using an image recognition technology, so as to determine whether there is medicine in the medicine cup 5; when there is no medicine in the medicine cup 5, the operation S3 is executed; when there is medicine in the medicine cup 5, the operation S4 is executed.

At the operation S3, the method may include driving the cellular tray 4 to rotate one grid by the driving mechanism 2, switching the next medicine cup 5 to the medicine taking port 131, and executing the operation S2.

In some embodiments, the control circuit module 100 starts the second motor 22, thereby driving the cellular tray 4 to rotate one grid.

At the operation S4, the method may include moving the medicine cup 5 upwards to the medicine taking port 131 by the lifting mechanism 6.

In some embodiments, the control circuit module 100 starts the first motor, which drives the driving device 61 to rotate forward. The first motor drives the connecting rod 64 to move upwards through the gear 62 and the gear rack 63, and the top holding column 65 moves upwards accordingly, pushing the medicine cup 5 out to the medicine taking port 131. At this time, the first sensing element 51 on the side wall of the medicine cup 5 faces towards the first infrared sensor 7. The first infrared sensor 7 receives the infrared ray reflected by the first sensing element 51 and feeds back the signal to the control circuit module 100 of the electronic medicine box, thereby determining that the medicine cup 5 is pushed out and there is the medicine cup 5 on the medicine taking port 131.

At the operation S5, the method may include the user taking out the medicine cup 5, wherein the first infrared sensor 7 does not receive the infrared ray reflected by the first sensing element 51, and feeds back the signal to the control circuit module 100 to determine that the medicine cup 5 of the medicine taking port 131 is taken away, thereby executing the operation S6.

At the operation S6, the method may include resetting the lifting mechanism 6 to prepare for the next taking medicine.

In some embodiments, the control circuit module 100 starts the first motor to reverse and drives the connecting rod 64 to move downwards. After the connecting rod 64 triggers the first microswitch 9, the control circuit module 100 closes the first motor. In this case, the reset of the lifting mechanism 6 is completed, preparing for the next taking medicine.

Of course, in the above operation S5, the camera 8 may also be configured to determine whether the medicine cup 5 is taken away. The advantage of using the first infrared sensor 7 to determine whether the medicine cup 5 is taken away in the present application is that it is more direct and accurate, may reduce the data computation of the control circuit module 100, and make the electronic medicine box more sensitive.

The above embodiments are only used to illustrate the technical solutions of the present disclosure, and not to limit the present disclosure. Although the present disclosure is described in detail with reference to the aforementioned embodiments, those skilled in the art should understand that they may still modify the technical solutions recorded in the aforementioned embodiments or equivalently replace some of the technical features thereof. And these modifications or replacements do not make the essence of the corresponding technical solutions deviate from the spirit and scope of the technical solutions of the various embodiments of the present disclosure.

What is claimed is:

1. An electronic medicine box with a medicine cup, comprising:

a housing, wherein the housing is provided with a medicine taking port;

a cellular tray;

a connecting assembly;

a plurality of medicine cups;

a driving mechanism;

a lifting mechanism, wherein the cellular tray is provided with a plurality of placement slots that are configured for accommodating the plurality of medicine cups; the cellular tray is rotatably disposed inside the housing through the connecting assembly, and is provided with the driving mechanism that is configured for rotating the cellular tray; and the lifting mechanism is configured for pushing the medicine cups out of the placement slots towards the medicine port;

a camera fixedly disposed on the housing, wherein the camera is configured to detect whether there is medicine in the medicine cup on the medicine taking port;

a first infrared sensor; and a first sensing element, wherein the first infrared sensor and the first sensing element are configured for detecting whether the medicine cup on the medicine taking port is taken away; and the housing is fixedly provided with the first infrared sensor located on an outer side below the medicine taking port with a transceiver surface thereof facing towards an outer side wall of the cellular tray, and an outer side wall of each medicine cup is fixedly provided with the first sensing element that is coordinated with the first infrared sensor, which is configured to detect whether the medicine cup on the medicine taking port is taken away;

wherein the lifting mechanism comprises a movable rod, a top holding column, and a driving device, the movable rod is fixedly provided with the top holding column, and the top holding column is located below the medicine cup, the top holding column is a cover body sleeved around the camera, with a top circumference of the top holding column being a transparent surface.

2. The electronic medicine box with the medicine cup as claimed in claim 1, wherein the housing is provided with a sliding rail, the movable rod is configured to move up and down on the sliding rail, and is provided with the driving device that allows the movable rod to move up and down; and the movable rod is fixedly provided with the top holding column, and the top holding column is located below the medicine cup.

3. The electronic medicine box with the medicine cup as claimed in claim 2, wherein a side wall of the movable rod is provided with a rack, the driving device is a first motor, and an output shaft of the first motor is in transmission connection with the rack through a gear; and the first infrared sensor is configured to start the first motor when the medicine cup is taken away, so that the first motor drives the top holding column to move down and reset.

4. The electronic medicine box with the medicine cup as claimed in claim 3, wherein the housing is further fixedly provided with a first microswitch, and the first microswitch is configured to shut down the first motor after the movable rod moves down and resets.

5. The electronic medicine box with the medicine cup as claimed in claim 2, wherein the top holding column is fixedly disposed on the movable rod through a connecting rod, and the top holding column, the connecting rod, and the movable rod are configured to move up and down on the sliding rail.

6. The electronic medicine box with the medicine cup as claimed in claim 2, wherein the top holding column is a cover body and disposed outside the camera, and a top circumference and a side circumference of the top holding column are transparent surfaces.

7. The electronic medicine box with the medicine cup as claimed in claim 1, wherein the connecting assembly comprises a cover plate, and the cover plate is provided with a knob switch that is configured for setting system time and a timing alarm.

8. The electronic medicine box with the medicine cup as claimed in claim 1, wherein the driving mechanism comprises a second motor and a gear set, the connecting assembly comprises a gear ring, the second motor is in transmission connection with the gear ring through the gear set, and the gear ring is fixedly connected to the cellular tray; and the driving mechanism further comprises a second infrared sensor and a second sensing element, and the second sensing element is assembled on the gear set and provided with the second infrared sensor.

9. The electronic medicine box with the medicine cup as claimed in claim 1, wherein the first sensing element is a metal material element, a highlight ABS plastic element, or an aluminum foil paper.

10. A usage method of an electronic medicine box according to claim 1, comprising:

S1, after receiving a medicine taking instruction, a control circuit module of the electronic medicine box entering a medicine taking mode;

S2, capturing an image of the medicine cup by the camera and inputting image information to the control circuit module, wherein the control circuit module analyzes and processes a captured image by using an image recognition technology, so as to determine whether there is medicine in the medicine cup; when there is no medicine in the medicine cup, an operation S3 is executed; when there is medicine in the medicine cup, an operation S4 is executed;

S3, driving the cellular tray to rotate one grid by the driving mechanism, switching the next medicine cup to the medicine taking port, and executing the operation S2;

S4, moving the medicine cup upwards to the medicine taking port by the lifting mechanism;

S5, after taking away the medicine cup, triggering the first infrared sensor and feeding back a signal to the control circuit module, to determine that the medicine cup on the medicine taking port is taken away, and executing an operation S6; and S6, resetting the lifting mechanism to prepare for the next taking medicine.

* * * * *